US006942238B1

(12) United States Patent
DeCarlo

(10) Patent No.: US 6,942,238 B1
(45) Date of Patent: Sep. 13, 2005

(54) UPRIGHT GOLF CART

(76) Inventor: Andrew J. DeCarlo, 20651 Wildcat Run Dr. #101, Estero, FL (US) 33928

( * ) Notice: Subject to any disclaimer, the term of this patent is extended or adjusted under 35 U.S.C. 154(b) by 0 days.

(21) Appl. No.: 10/066,883

(22) Filed: Feb. 4, 2002

(51) Int. Cl.$^7$ ............................................... B62B 1/00
(52) U.S. Cl. ................ 280/651; 280/655.1; 280/47.34; 280/DIG. 6
(58) Field of Search .......................... 280/47.34, 47.35, 280/DIG. 6, 62, 651, 655, 655.1, DIG. 5; 180/65.1; D34/15

(56) References Cited

U.S. PATENT DOCUMENTS

| | | | | |
|---|---|---|---|---|
| 2,706,008 A | * | 4/1955 | Voigt ........................... | 180/19.2 |
| 2,772,113 A | * | 11/1956 | Berard ........................ | 180/65.1 |
| 3,023,021 A | * | 2/1962 | Fricke et al. ............. | 280/47.34 |
| 3,123,173 A | * | 3/1964 | Jacobs ......................... | 180/343 |
| D201,354 S | * | 6/1965 | Jones ........................... | D34/15 |
| 3,305,244 A | * | 2/1967 | Flagg ....................... | 280/47.35 |
| 3,312,300 A | * | 4/1967 | Jones ........................... | 180/19.2 |
| D219,509 S | * | 12/1970 | Maltrap ....................... | D34/15 |
| 3,926,448 A | * | 12/1975 | Reichard ..................... | 280/1.5 |
| 4,289,324 A | * | 9/1981 | Nemeth ........................ | 280/38 |
| 5,307,889 A | * | 5/1994 | Bohannan ..................... | 180/13 |
| D350,426 S | * | 9/1994 | Liao et al. .................... | D34/15 |
| D493,018 S | * | 7/2004 | Liao ............................. | D34/15 |
| 2003/0071428 A1 | * | 4/2003 | Kang ........................... | 280/62 |

* cited by examiner

Primary Examiner—Bryan Fischmann
(74) Attorney, Agent, or Firm—William E. Noonan

(57) ABSTRACT

A golf cart for supporting a golf bag and clubs in a vertically upright condition upon an underlying surface includes a carriage for accommodating the bag. Two axially aligned forward wheels are axially rotatably connected to the carriage. At least one rearward wheel is swivelably and rotatably mounted to the carriage. Each wheel is rotatably engagable with the underlying surface. The carriage includes a base for engaging the bottom of the golf bag. A support frame extends upwardly from the base and carries at least one upper holder spaced above the base for engaging the bag placed on the base such that the bag is held in a vertically upright condition. A handle is attached to and extends rearwardly of the frame such that applying a generally horizontal pushing or pulling force to the handle causes the cart to move over the underlying surface on the wheels while the bag and clubs are maintained in the vertically upright condition.

9 Claims, 7 Drawing Sheets

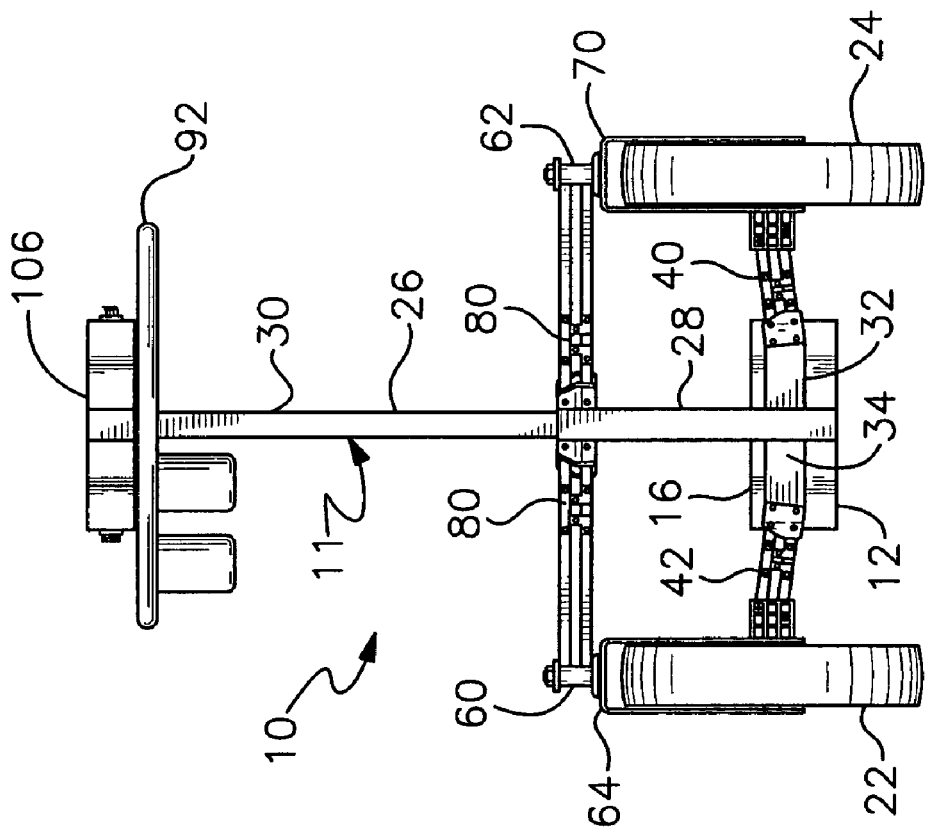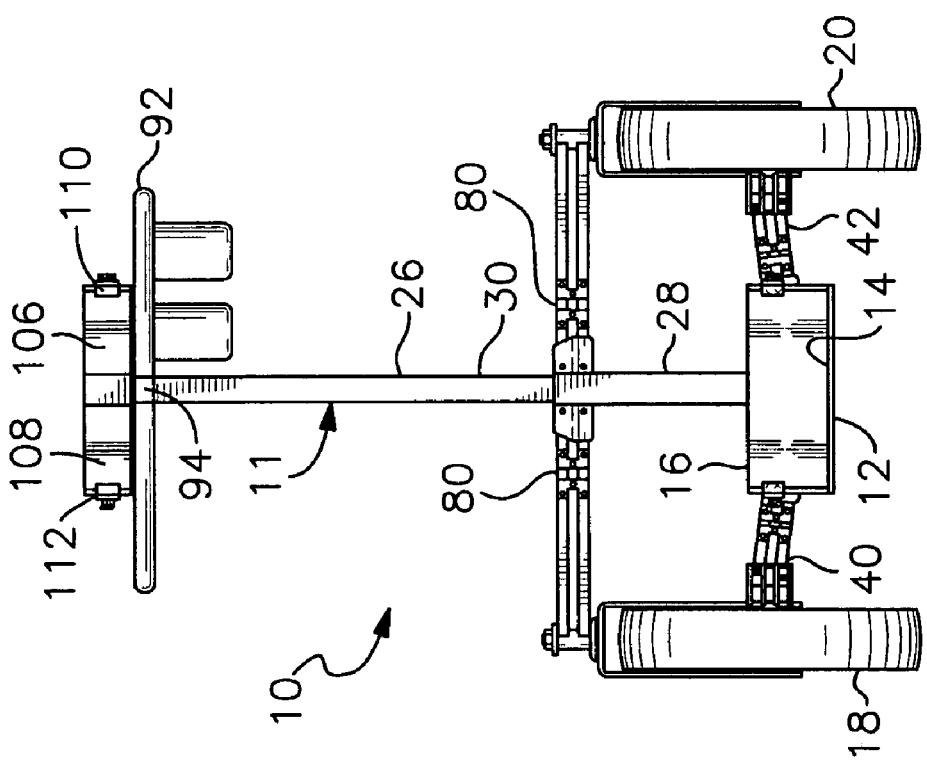

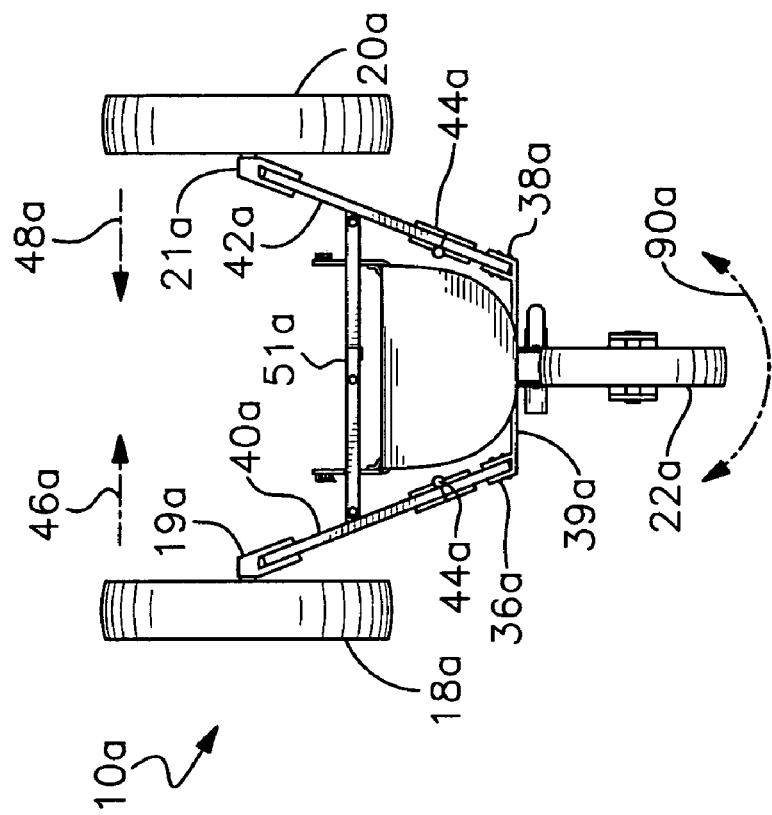
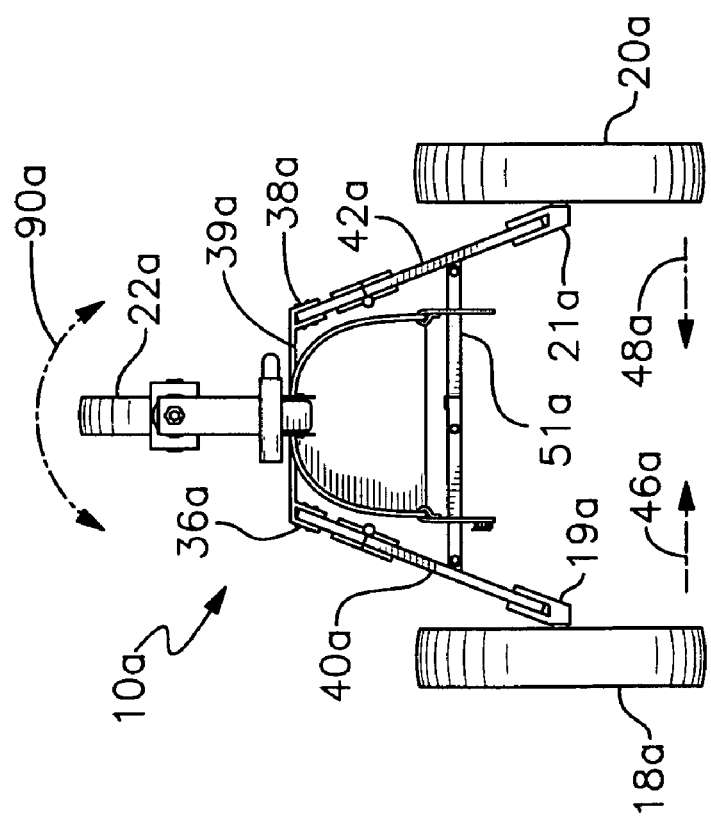

UPRIGHT GOLF CART

FIELD OF THE INVENTION

This invention relates to an upright golf cart and in particular to a golf cart that is designed to be pushed or pulled by a golfer who is "walking" the golf course while playing round of golf. More particularly, the cart supports a golf bag and golf clubs in a vertically upright condition.

BACKGROUND OF THE INVENTION

Although motorized "riding" golf carts have become increasingly popular in recent years, many golfers still prefer the benefits of walking during a round of golf. Walking the golf course provides considerably more physical exercise. It also requires less expense because a motorized cart does not have to be rented. Nonetheless, carrying a heavy golf bag can be physically strenuous and tiring, particularly during hot weather or when the terrain requires uphill climbs. An older golfer or a person with physical limitations may find it virtually impossible to tote his or her own bag. Traditionally, caddies were available to provide assistance. This practice has almost completely disappeared from many golf courses.

Currently, most golfers who walk utilize push carts or pull carts. A wide variety of such manually operable carts have been available for many years. Typically, the cart supports the golf bag and clubs at a tilted or inclined orientation. The cart rolls on a pair of wheels that engage the ground between the golfer and the bottom of the supported golf bag.

Conventional golf carts of the type described above exhibit a number of problems. Because the clubs are supported at an angle, they tend to be jumbled together in a pile within the bag. It is often difficult for the players to quickly and accurately differentiate the clubs and select the proper club for the next shot. Additionally, the constant jumbling of clubs can, over time, cause the clubs to nick, scratch and otherwise damage one another. It can also be awkward, difficult and annoying to remove a club from the pile of clubs in the tilted bag and then return the club to the bag after the shot is completed. Persons with physical limitations can have particular difficulty pulling clubs out of the bag. The clubs tend to stick and the grips are subjected to considerable wear and tear. All of these problems result directly from the fact that the bag is inclined and the clubs are therefore piled together within the bag.

Standard pull carts also tend to be fairly unstable. If the cart is placed on an uneven surface, the weight of the club heads can cause the bag to tip over. This is annoying, distracting and can result in lost golf equipment which falls out of the bag.

SUMMARY OF THE INVENTION

It is a further object of this invention to provide an upright golf cart which is particularly intended for a golfer to use while walking the golf course.

It is therefore an object of the present invention to provide an improved golf cart for walking golfers, which cart supports a golf bag and clubs in a vertically upright condition so that the clubs are better separated and more clearly displayed.

It is a further object of this invention to provide a golf cart that supports the golf bag so that clubs are easier to retrieve from and return to the bag.

It is a further object of this invention to provide a walking golf cart that supports the golf bag so that the clubs experience less damage and exhibit a longer life.

It is a further object of this invention to provide an upright golf cart that is extremely stable on virtually all golf course terrains and which resists tipping over.

It is a further object of this invention to provide an upright golf cart that is extremely convenient to maneuver either by pushing or pulling over a golf course.

It is a further object of this invention to provide an upright golf cart, which allows the user to achieve the benefits of walking the golf course while, at the same time, providing convenient and easily to maneuverable transport of the golfer's bag and clubs.

This invention features an upright golf cart for supporting a golf bag and clubs therein in a vertically upright condition upon an underlying surface. The cart includes a carriage for accommodating the golf bag. There are two axially aligned forward wheels rotatably connected to the carriage and at least one rearward wheel rotatably and swivelably connected to the carriage. Each wheel is rotatably engagable with the underlying surface. The carriage includes a base and a support frame that extends upwardly from the base and carries at least one holder for retainably engaging a golf bag placed on the base such that the bag is held in a vertically upright condition. A handle is attached to and extends rearwardly of the frame. Applying a generally horizontal pushing or pulling force to the handle causes the cart to move over the underlying surface on the wheels while the bag and clubs are maintained in the vertically upright condition.

In a preferred embodiment, the vertically upright condition comprises an axis that is inclined not more than 12° relative to the plane of the supporting surface. The base may include a platform and a lift that at least partly surrounds the platform. The base may be disposed between the axis interconnecting said forward wheels and an axis of said rearward wheel.

Typically, the forward wheels are each at least as large diametrically as each rearward wheel. A pair of rearward wheels may be employed. Each may be movably alignable with a respective one of the forward wheels. Alternatively, a single rearward wheel may be disposed laterally between the wheels in the forward pair.

The support frame may include a bar that extends vertically upwardly from the base. The handle may include an elongate loop member that extends rearwardly of the bar and has two opposite ends that are connected to the bar. Alternatively, the handle may include an elongate stem that is connected to the bar beneath a longitudinal midpoint thereof. The stem may be pivotably connected at a lower end thereof to the bar. A plurality of legs or struts may be provided, each for connecting a respective wheel to the base. Each strut may be alternatable between a open condition wherein the connected wheel is deployed for movement on the underlying surface and a collapsed condition for storage of the cart.

The holder may include a bracket for receiving and at least partially encircling the bag. The holder may include a strap apparatus carried by the bracket and alternatable between an open condition wherein the bag may be selectively introduced into and removed from the bracket and a closed condition wherein a bag accommodated by the bracket is held by the holder.

DETAILED DESCRIPTION OF PREFERRED EMBODIMENTS

Other objects, features and advantages will occur from the following description of a preferred embodiment and the accompanying drawings, in which:

FIG. 1 is a front elevational view of a preferred four-wheel version of the upright golf cart of this invention;

FIG. 2 is an elevational rear view of the golf cart of FIG. 1;

FIG. 10 is a top plan view of the three-wheel cart;

FIG. 11 is a bottom plan view of the three-wheel cart; and

Figure 3:
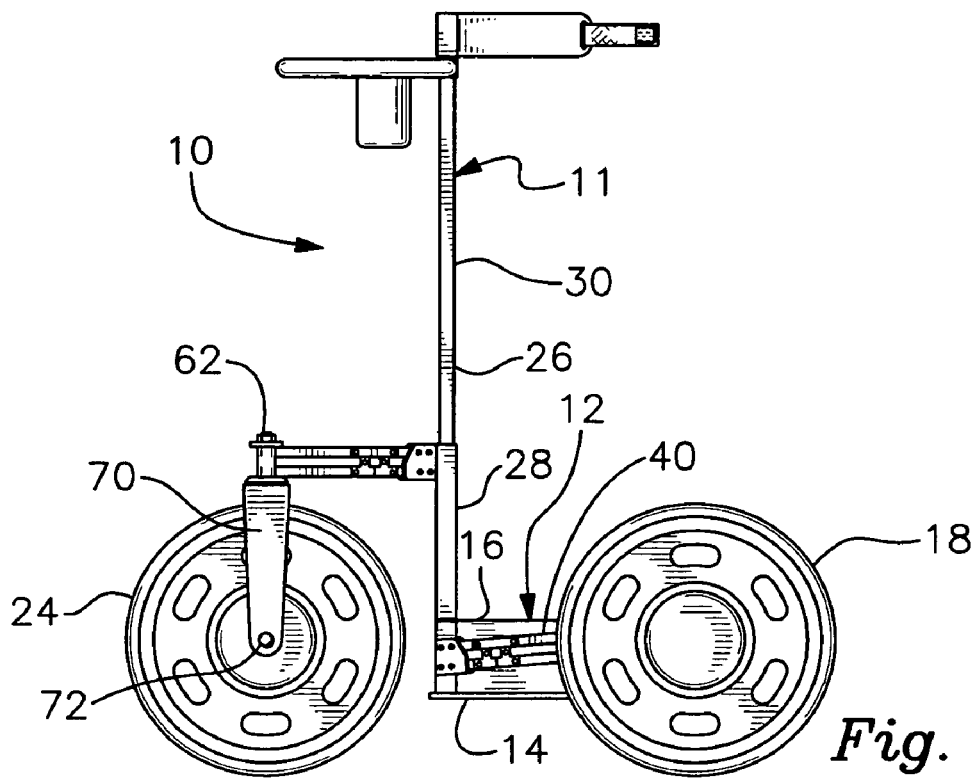
FIG. 3 is an elevational right-hand view of the cart.
Figure 4:
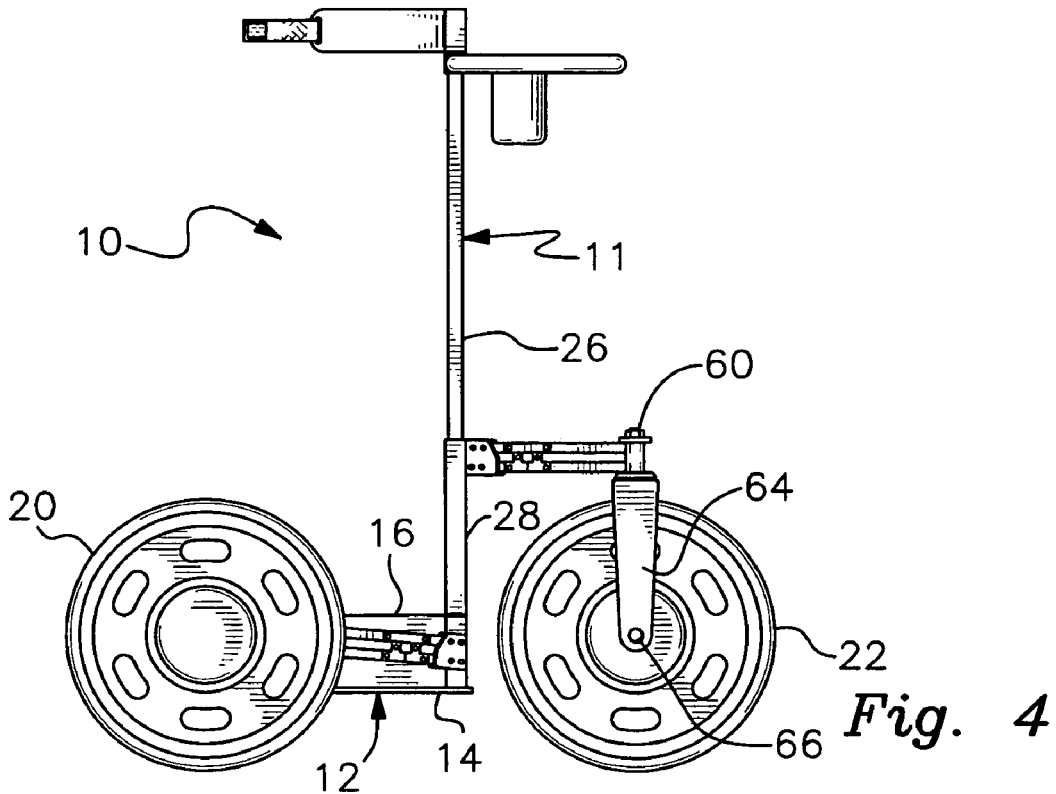
FIG. 4 is an elevational left-hand view of the cart.

There is shown in FIGS. 1–6 an upright golf cart 10 that is intended for use by a walking golfer. The cart is uniquely designed to allow the golfer to walk the golf course while maintaining the bag and clubs in a vertically upright condition. This allows the clubs to be clearly and distinguishably displayed and differentiated, and provides much improved access to the golf bag. As used herein, "vertically upright" should be understood to mean that the longitudinal axis of the supported bag and clubs is substantially perpendicular, and in any event, inclined no more than 12° from perpendicular, relative to the plane of the underlying surface.

Cart 10 includes a carriage 11 for supporting the golf bag. More particularly, carriage 11 features a metal or plastic base 12 for receiving the bottom of the bag. Base 12 includes a lower plate or platform 14 and a peripheral wall or lip 16 that is attached to and extends upwardly from base 14. Lip 16 may be secured unitarily or by welding to platform 14, or it may be attached to the platform by brackets, clips or other appropriate means. The lip typically extends only partly about the periphery of the platform, as best shown in FIG. 1. The front of base 12 is open. This allows the bottom of the golf bag to be conveniently inserted into and removed from the base when required. It should be noted that in some embodiments, the lip may be omitted entirely and just a platform or some other form of supporting base may be utilized.

Carriage 11 also includes a support frame 26, which is connected and extends vertically upwardly from base 12. In particular, frame 26 includes a bar or post comprising a pair of elongate frame components 28 and 30 that are aligned and joined by welding, bolts, rivets or other suitable means. The frame components may be composed of a lightweight yet durable metal, metal alloy or synthetic material. Each of frame components 28 and 30 may employ a tubular or solid construction. The frame components may be rigidly joined or telescopically collapsible. The lower end of frame component 28 is secured to the rear of base 12, again by welding, bolts, rivets or other suitable means. Frame component 28 is secured directly to platform 14 and/or side wall peripheral lip 16 of base 12.

Cart 10 includes an axially aligned pair of forward wheels 18 and 20 that are axially rotatably mounted on respective sides of carriage 11. A second aligned pair of rearward wheels 22 and 24 are rotatably and swivelably connected to the carriage. Forward wheel 20 is generally aligned (in the direction of travel) with rearward wheel 22. Forward wheel 18 is similarly aligned with rearward wheel 24. Various known types of wheels and wheel bearing structures may be employed. In the version shown, the wheels have equivalent diameters.

Figure 6:
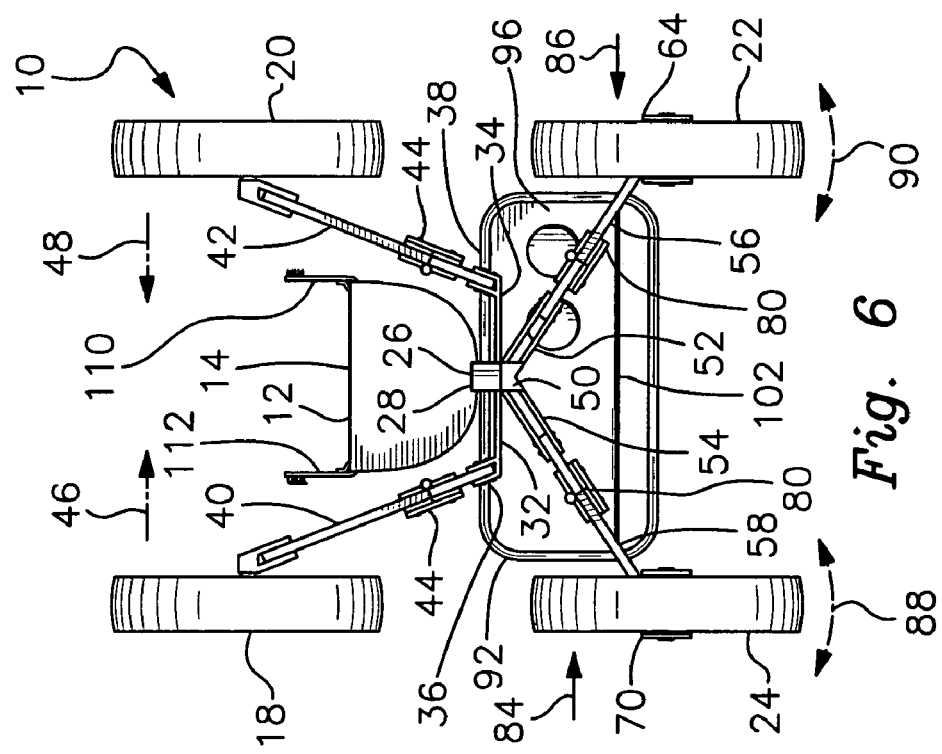
FIG. 6 is a bottom plan view of the cart.

Front wheels 18 and 20 are axially rotatably connected to lower frame component 28. Specifically, a pair of lateral mounting brackets 32, 34, best shown in FIGS. 2 and 6 are secured to and extend laterally from frame component 28. Brackets 32 and 34 include respective tubular receptacles 36 and 38. Receptacle 36 receives the inner end of a collapsible strut 40. Receptacle 34 similarly receives the inner end of a second collapsible strut 42. Forward wheel 18 is mounted rotatably on the outer end of collapsible strut 40; forward wheel 20 is similarly mounted on the outer end of collapsible strut 42. Each of the struts includes a hinge 44 that permits the attached wheel to collapse as shown by arrows 46 and 48. (See FIGS. 5 and 6).

Rearward wheels 22 and 24 are rotatably and swivelably connected to frame component 28 of frame 26. As best shown in FIG. 6, a rearward mounting bracket 50 is attached to frame component 28. A pair of receptacles 52 and 54 extend from bracket 50 in a diverging manner. The inner end of a first rearward strut 56 is received by receptacle 52. Likewise, the inner end of a second rearward strut 58 is received by receptacle 54. The outer end of strut 56 is attached to a first spindle 60 (FIGS. 2 and 4); the outer end of strut 58 is likewise attached to a second spindle 62 (FIGS. 2 and 3). The spindles swivelably support respective wheels 22 and 24 from the support frame. In particular, spindle 60 is attached to a yoke 64 having depending legs that overlap respective sides of wheel 22. An axle 66 axially rotatably interconnects wheel 22 with the legs of yoke 64. In a similar manner, spindle 62 is attached to a second yoke 70 having depending legs that overlap respective sides of wheel 24. An axle 72 axially rotatably interconnects wheel 24 to depending yoke 70. In this manner, the wheels 22 and 24 are both swivelably and axially rotatably attached to carriage 11.

The rearward struts 56 and 58 are hingedly collapsible in a manner similar to the forward struts. Each strut includes a hinge assembly 80 that pivotably joins individual segments of a respective rearward strut. This allows the rearward struts to fold so that legs 22 and 24 may be collapsed as indicated by arrows 84 and 86 in FIG. 6. Swivelability of the rearward wheels is illustrated by double headed arrows 88 and 90 in FIGS. 5 and 6. In alternative versions, the front and back struts may be collapsed by other means such as telescoping components.

A handle 92 is secured to the upper end of support frame 26. Handle 92 comprises an elongate, tubular loop member having a generally rectangular shape with square corners. Opposing ends of the loop member are secured to an upper end of the support frame and, more particularly, to a mounting bracket 94 carried at the upper end of elongate component 30. The loop member thereby extends rearwardly from support frame 26 and defines a handle that may be grasped and either pushed or pulled to move cart 10. It should be understood that a wide variety of alternatively shaped handles may be utilized.

Figure 5:
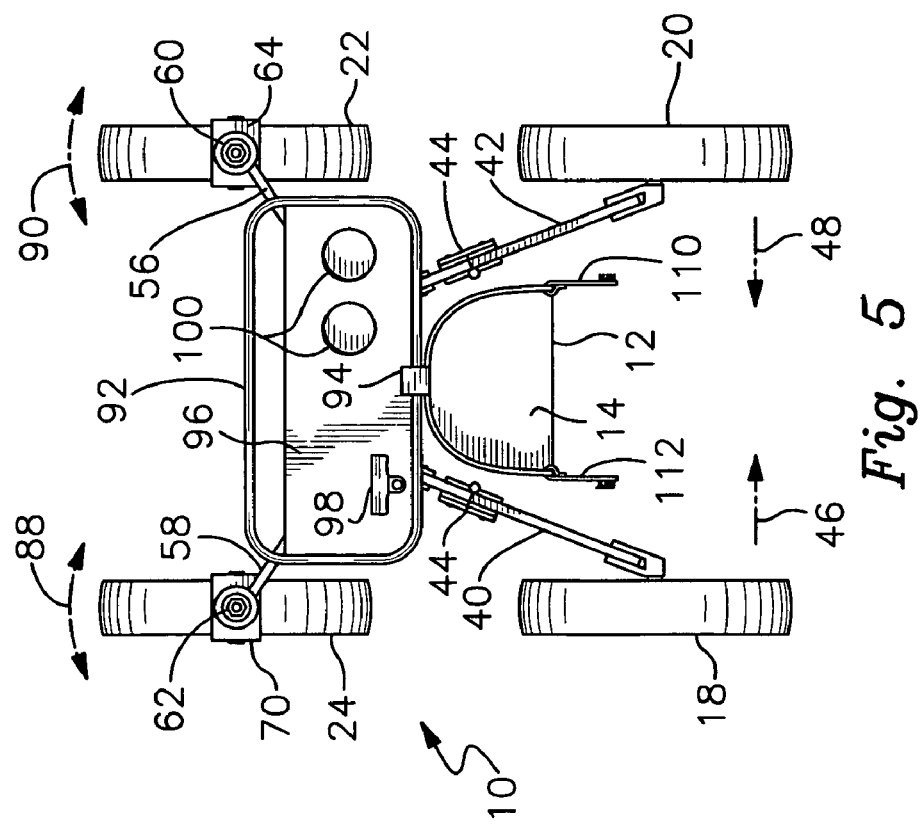
FIG. 5 is a top plan view of the cart.

A tray 96 may be centrally mounted within loop shaped handle 92. Tray 96 is typically composed of a suitable lightweight, yet durable plastic. The upper surface of the tray may carry a clip 98 (FIG. 5) for holding a score card. One or more receptacles 100 may be formed in the tray for supporting cups, cans or other types of beverage holders. As best shown in FIGS. 5 and 6, a rearward edge 102 of tray 96 is spaced apart from an elongate segment of handle 92. This allows the golfer to conveniently grasp the handle through the gap between the handle and the tray.

An upper bag holder 106 is carried by the top of support frame 26. Holder 106 specifically includes a curved bracket 108 that is attached to the upper end of frame component 30 by appropriate fastening means. Bracket 108 has a curved shape that generally conformably engages the upper portion of a conventional golf bag. A pair of strap components 110, 112 are carried by respective ends of bracket 106. The strap components themselves include complementary Velcro™ elements that permit the strap components to be selectively interengaged and disengaged to respectively secure the holder about a golf bag or release the holder from the bag.

Figure 7:
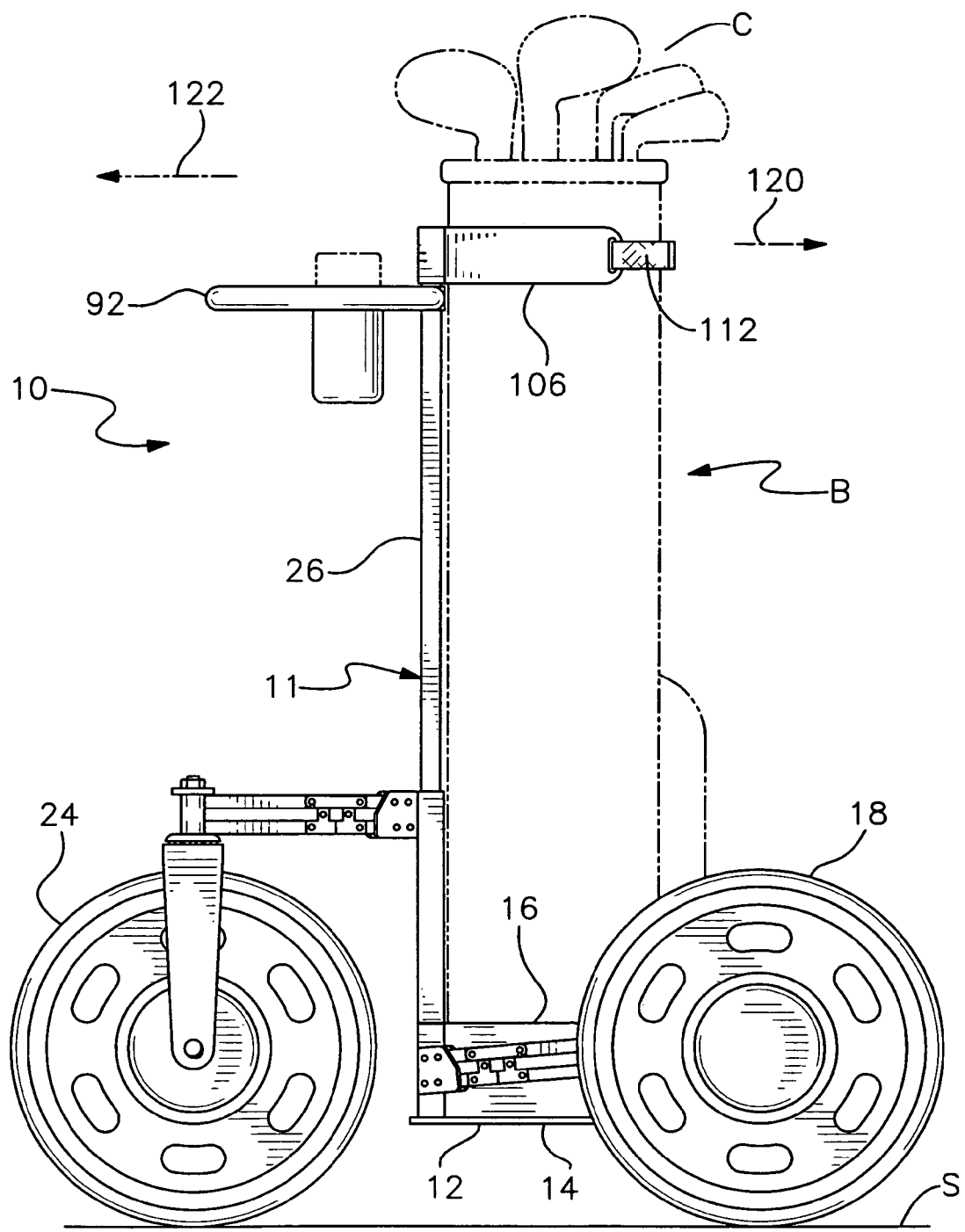
FIG. 7 is a right-hand elevational view of the cart of FIG. 1 depicting, in phantom, a golf bag and accommodated golf clubs supported on the cart.
Figure 9:
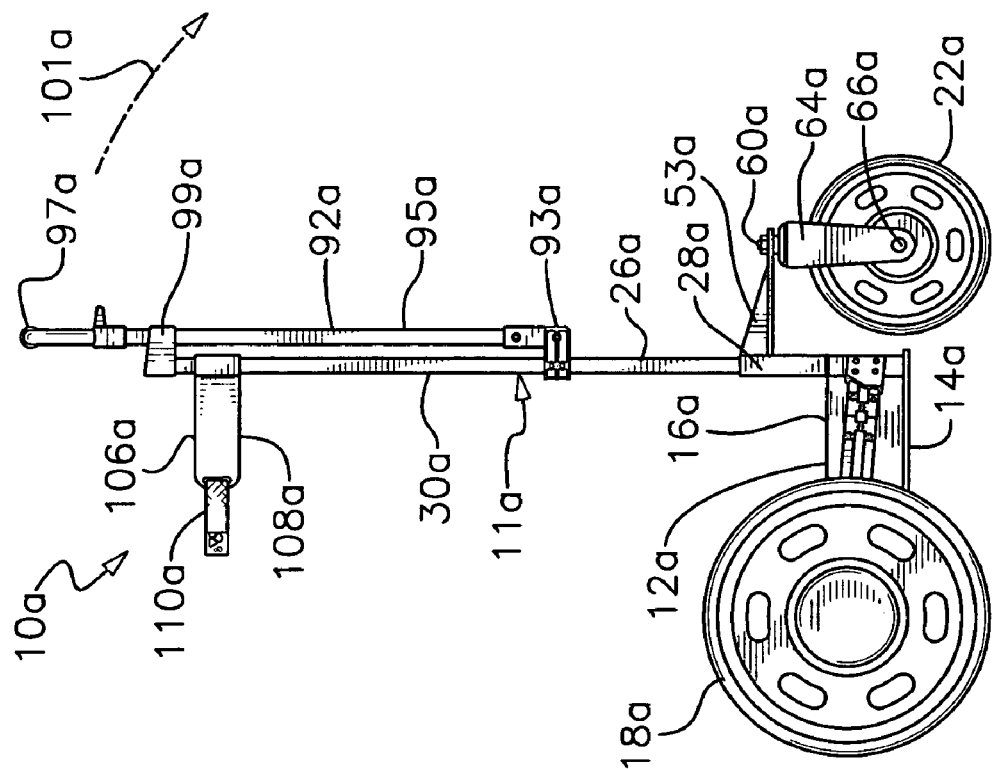
FIG. 9 is an elevational left-hand view of the three-wheel cart.
Figure 8:
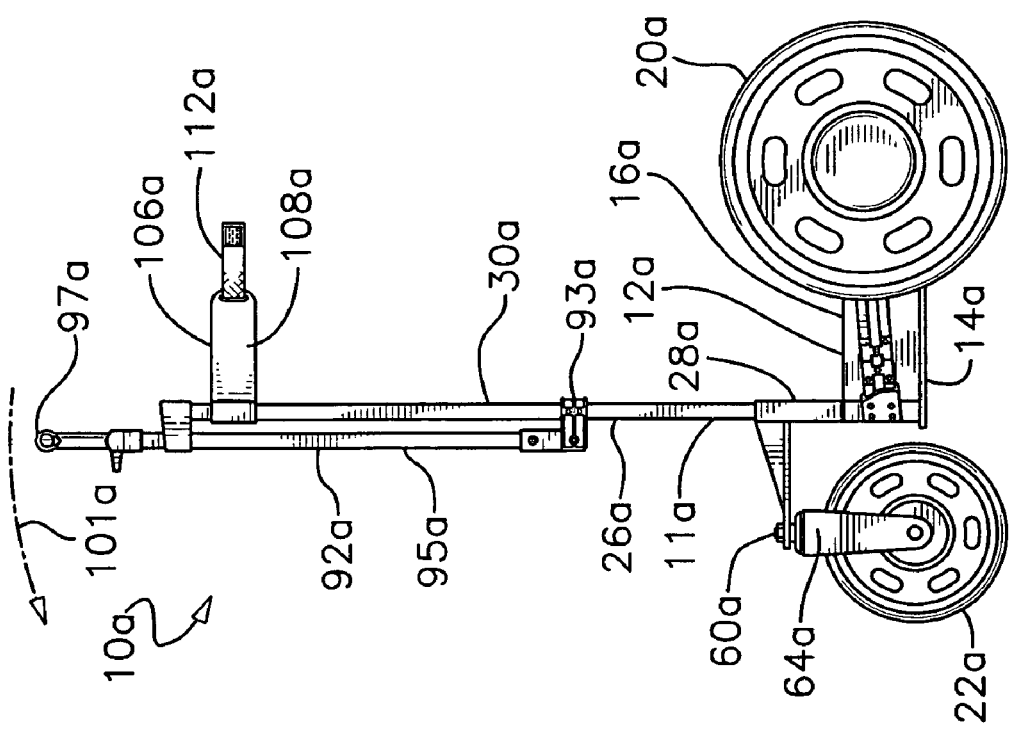
FIG. 8 is an elevational right-hand view of an alternative three-wheel version of the cart of this invention.

There is shown in FIG. 7 a golf bag B depicted in phantom and mounted on carriage 11 of cart 10. The lower end of the bag is supported on platform 14 of base 12. Side wall 16 conformably receives and supports the bag. The upper end of bag B is peripherally surrounded and secured to the cart by holder 106. Support frame 26 extends vertically upwardly from base 12. The base, support frame and holder are orientated such that when cart 10 is placed on a generally flat or horizontal underlying surface S, the golf bag B and golf clubs C within the bag are supported in a vertically upright condition. More particularly, the clubs should not be tilted or inclined more than 12° relative to the vertical axis. In this manner, the clubs are supported upright so that they remain separated and clearly visible to the golfer. It is therefore much easier for the golfer to identify, differentiate and retrieve clubs as needed and to return those clubs to their proper spot after a shot has been made. Additionally, the clubs remain conveniently separated within the bag so that they do not pile together and potentially damage one another. Because the clubs are not piled, jumbled and stuck together, it is much easier to pull them individually out of the bag and return them to the bag.

Cart 10 is operated by grasping handle 92 and pushing the cart in the direction indicated by arrow 120. Alternatively, the handle may be grasped and the cart pulled in the direction of arrow 122. In either case, the large diameter and well separated wheels enable the cart to move easily and effortlessly over virtually all golf course terrains. The swiveling rear wheels 22 and 24 allow the cart to maneuver conveniently through a very tight turning radius. The orientation of the base, the frame and the holder maintain the bag and the supported clubs in an upright condition (e.g. inclined less than 12° relative to the underlying surface S).

It should be understood that the individual pieces and parts of the cart may be composed of many various types of lightweight yet durable metals, metal alloys and plastics within the scope of this invention.

An alternative golf cart 10a according to this invention is depicted in FIGS. 8–12. This version employs three wheels and an elongate handle that is pivotably attached to the support frame. As in the prior embodiment, a critical feature of this version is that the golf bag is supported in a vertically upright condition.

Carriage 11a of cart 10a includes a base 12a having a platform 14a and a surrounding wall 16a. An elongate support frame 26a includes lower and upper posts or frame components 28a and 30a that are aligned and interconnected. The support frame is fastened to and extends upwardly from base 12a.

A plurality of wheels are rotatably mounted to the support frame and the base. In particular, a pair of relatively large diameter forward wheels 18a and 20a and a single relatively small diameter swiveling wheel 22a are mounted to frame component 28a of support frame 26a. Front wheels 18a and 20a are axially rotatably mounted on bearings that carry respective tubular receptacles 19a and 21a. Each receptacle 19a, 21a receives the forward end of a respective collapsible strut 40a, 42a. The opposite ends of the struts are mounted within respective receptacles 36a and 38a of a mounting bracket 39a. The struts are secured within the receptacles by bolts, rivets or other fastening means. Bracket 39a is secured to a lower portion of frame component 28a. Each strut includes a hinge 44a that permits the strut to collapse so that the front wheels 18a and 20a may be selectively folded as indicated by arrows 46a and 48a in FIGS. 10 and 11. A foldable brace 51a is interconnected between respective intermediate portions of the struts 40a and 42a. This brace helps to hold the front wheels in the open condition shown in FIGS. 10 and 11.

Rear wheel 22a is secured to lower component 28a of frame 26a by a mounting bracket 53a that is permanently secured to the frame component. A yoke 64a is swivelably supported by a spindle 60a from the distal end of bracket 53a. Wheel 22a is axially rotatably supported by a shaft or axle 66a that extends between the depending legs of yoke 64a. As a result, wheel 22a is not only axially rotatable, it also swivels as indicated by double headed arrow 90a in FIGS. 10 and 11.

A bag holder 106a analogous to that previously described, is attached to the upper end of support post 30a. The holder includes a concave bracket 108a that extends forwardly from the support post for accommodating a bag that is placed on base 12a. Velcro™ straps 110a, 112a are carried by distal ends of bracket 108a for peripherally surrounding and selectively securing the bag.

Figure 12:
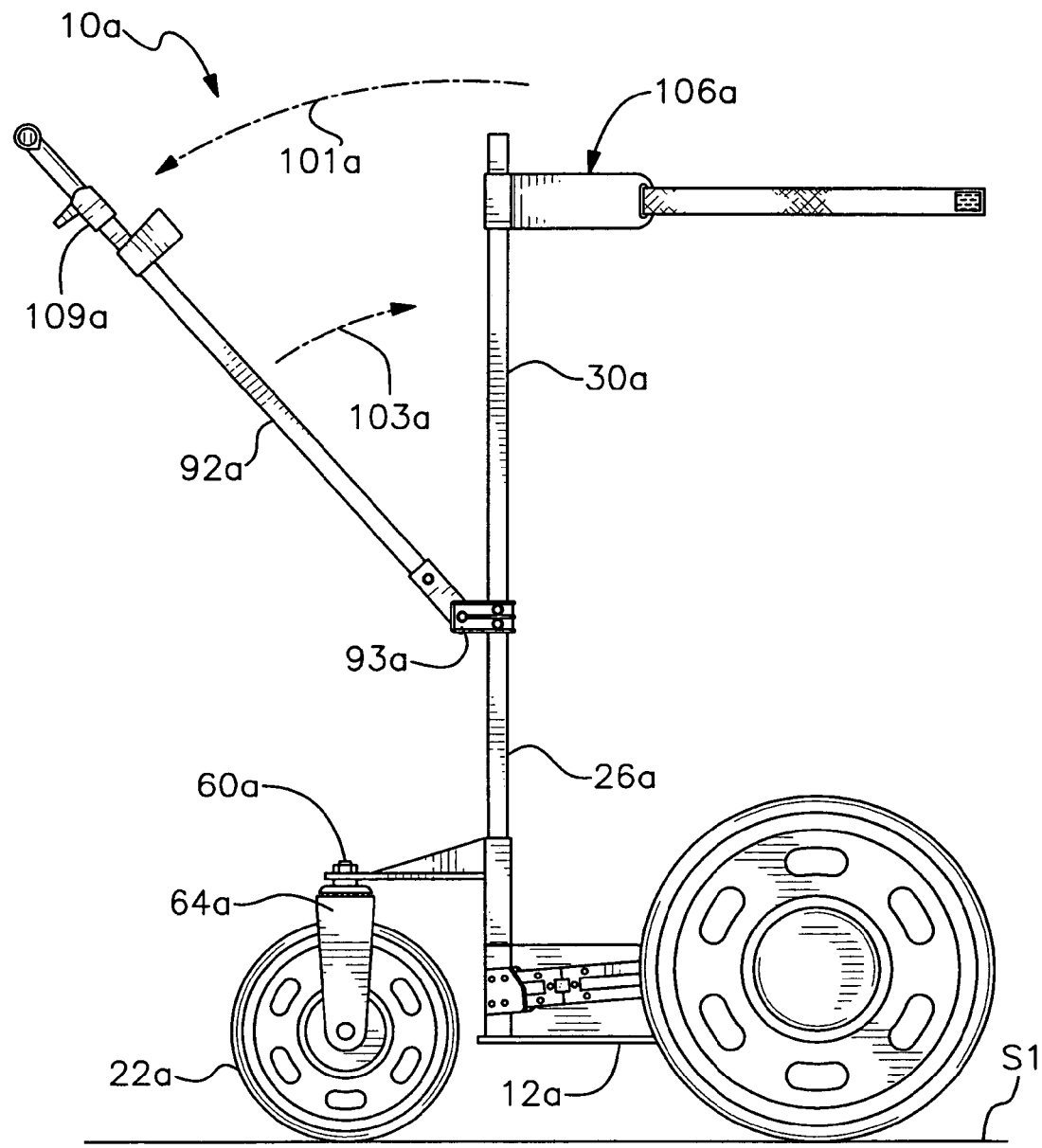
FIG. 12 is an elevational right-hand view of the three-wheel cart with the handle deployed for operation of the cart.

An elongate handle 92a is attached pivotably to component 30a of elongate support frame 26a. In particular, a pivot bracket 93a pivotably secures handle 92a to the vertical support post. Handle 92a includes an elongate bar 95a and a transverse gripping portion 97a formed at the upper end of bar 95a. A support clip 99a is carried by the handle 92a and, more particularly, is selectively engagable with the upper end of support element 30a when the handle is in a vertically upright condition. This locks the handle into the upright condition. Various types of releasable clips may be employed. The handle may be selectively disengaged from frame component 30a and pivoted downwardly as indicated by arrow 101a into the condition as shown in FIG. 12. Alternatively, the handle may be pivoted upwardly from the condition shown in FIG. 12, as indicated by arrow 103a into the vertically upright condition shown in FIGS. 8 and 9. In that condition, the clip 99a is selectively engaged with the upper end of support post component 30a so that the handle is held in the upright condition. A grasping element 109a is conveniently accessible to the user's finger and enables the handle to be conveniently grasped so that it may be pivoted selectively in an upward and downward condition and, when required, latched onto or released from the upper end of support component 30a.

In operation, a bag is placed on base 12a and the upper end of the bag is retained by holder 106a in the manner previously described. As a result, the bag is held upright (e.g. is tiled no greater than 12° from the axis perpendicular to the underlying support surface S1). This maintains the clubs in a convenient, segregated condition so that the benefits described above are achieved.

To move the golf cart, the golfer pivots handle 92a downwardly as indicated by arrow 101a. The golfer stands rearwardly of the cart and either pushes or pulls the cart by applying a desired force to the handle. The swiveling rearward wheel 22a allows the cart to maneuver conveniently and freely across a golf course terrain.

The individual components of cart 10a may be constructed of various metals, metal alloys and synthetic materials as in the previous embodiment. It should be noted that various types of hinges, brackets, bearings, support struts and wheels may be employed within the scope of this invention. Preferably, the axes of the forward and rearward wheels should be disposed forwardly and rearwardly, respectively, of the golf bag so that an evenly distributed support is provided.

From the foregoing it may be seen that the apparatus of this invention provides for an upright golf cart and in particular to a golf cart that is designed to be pushed or pulled by a golfer who is "walking" the golf course while playing a round of golf. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

It should be noted that various additional modifications may be made within the scope of this invention. For example, the cart may include a motorized mechanism for driving the wheels to assist movement of the cart. The base, frame and holder of the carriage may be constructed to accommodate multiple golf bags thereon. The support frame may include multiple posts and/or handles. Various arrangements of three and four wheels may be utilized.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A cart for supporting a golf bag and clubs therein in a vertically upright condition upon an underlying surface, said cart comprising:

a carriage for accommodating the golf bag;

a pair of axially aligned forward wheels which are axially rotatably connected to said carriage and at least one rearward wheel that is swivelably and rotatably mounted to said carriage, each said wheel being rotatably engagable with the underlying surface;

said carriage including a base for engaging the bottom of the golf bag and a support frame extending upwardly from the base and carrying at least one upper holder above the base for engaging a bag placed on said base such that the bag is held in a vertically upright condition; and a handle attached to and extending rearwardly from said frame, whereby applying a generally horizontal pushing or pulling force to said handle causes said cart to move over the underlying surface on said wheels while the bag and clubs are maintained in the vertically upright condition; at least one of said wheels being carried by a strut that is connected to said frame, said strut being alternatable between an open condition wherein said wheel attached to said strut is deployed for moving on the underlying surface and a collapsed condition wherein said wheel attached to said strut is retracted for storage of said cart.

2. The cart of claim 1 in which said vertically upright condition comprises an axis that is inclined less than 12° relative to the plane of the supporting surface.

3. The cart of claim 1 in which said base includes a platform and a side wall at least partly surrounding said platform.

4. The cart of claim 1 including a pair of rearward wheels, each said rearward wheel being movably alignable with a respective one of said forward wheels.

5. The cart of claim 1 further including a single rearward wheel which is disposed laterally between said forward pair of wheels.

6. The cart of claim 1 in which said support frame includes at least one elongate bar extending vertically upwardly from said base.

7. The cart of claim 6 in which said handle includes an elongate loop member that extends rearwardly from said bar and has two opposite ends that are connected to said bar.

8. The cart of claim 1 in which said holder includes a concave bracket for receiving and at least partially encircling the bag mounted on the cart.

9. The cart of claim 8 in which said holder further includes a strap carried by such bracket and alternatable between an open condition wherein the golf bag may be selectively introduced into and removed from said bracket, and a closed condition wherein a bag accommodated by said bracket is held therein by said strap.

* * * * *